Sept. 14, 1965     A. C. MAMO     3,205,661

HYDRAULIC TORQUE CONVERTER

Filed Oct. 28, 1963     2 Sheets-Sheet 1

Inventor:
Anthony C. Mamo
By: Frank C. Parker
Atty.

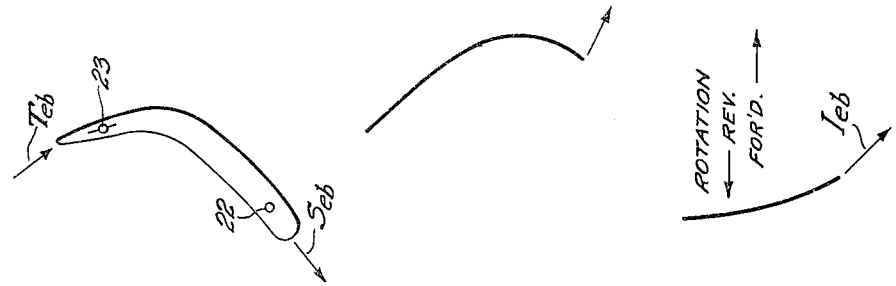
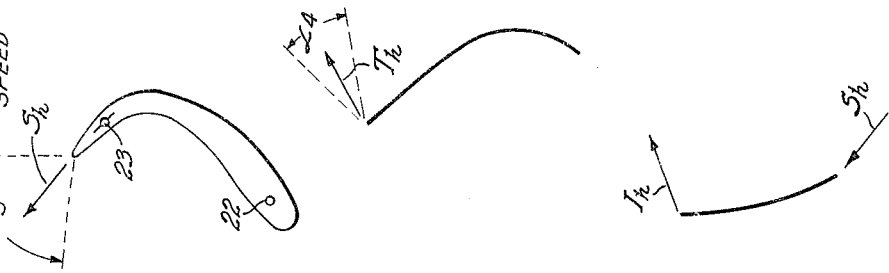
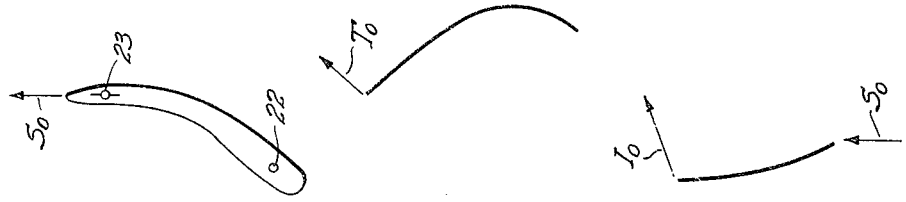
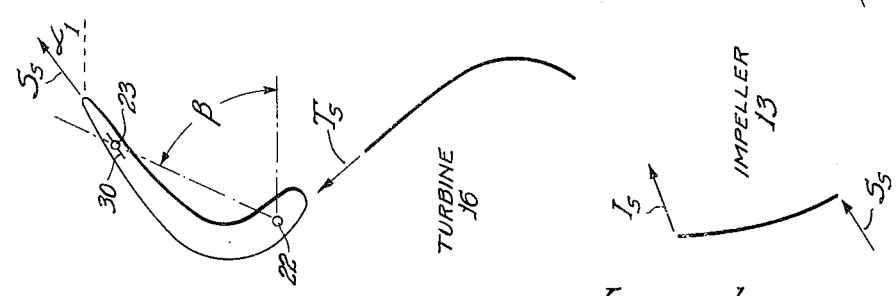

United States Patent Office 3,205,661
Patented Sept. 14, 1965

3,205,661
HYDRAULIC TORQUE CONVERTER
Anthony C. Mamo, Des Plaines, Ill., assignor to Borg-Warner Corporation, Chicago, Ill., a corporation of Illinois
Filed Oct. 28, 1963, Ser. No. 336,849
5 Claims. (Cl. 60—54)

The present invention is a continuation-in-part of Serial No. 83,860 filed January 13, 1961 entitled Hydraulic Torque Converter (now abandoned) and is a continuation-in-part of Serial No. 685,831 filed September 24, 1957 entitled Hydraulic Torque Converter (now abandoned).

This invention relates generally to hydraulic torque converters of the type comprising a plurality of vaned elements which together define a substantially toroidal fluid circuit, wherein one of the elements comprises an impeller for imparting kinetic energy to the fluid, a second of the elements comprises a turbine for absorbing kinetic energy from the fluid and a third of the elements comprises a stator or reaction member for enabling the conversion of torque by the torque converter.

The principal object of the present invention is to provide an improved hydraulic torque converter of the above described general type wherein the stator means comprises a plurality of vanes which, during predetermined operating conditions, each include effectively reversely inclined portions capable of imparting a reverse flow component to the fluid leaving the turbine and prior to its re-entry into the impeller so as to thereby load the impeller on the back side of the impeller blades.

More specifically, it is an object of the present invention to provide a hydraulic torque converter in accordance with the foregoing principal object of the invention, and further characterized by the fact that the stator vanes are flexibly mounted so as to be capable of imparting said reverse flow component to the fluid leaving the turbine means and prior to its re-entry into the impeller means during only predetermined conditions of operation of the torque converter.

It is a further object of the present invention to provide a hydraulic torque converter comprising relatively rotatable impeller and turbine members and a relatively stationary stator member wherein the stator blades are flexible and responsive to the fluid leaving the turbine member, and the stator vanes are also effective to re-direct the fluid in a more forward direction during certain operating conditions and to re-direct the fluid leaving the turbine in a more reverse direction during certain other operating conditions of the converter.

A more detailed object of the present invention is to provide a hydraulic torque converter wherein the stator vanes are flexible and are flexibly mounted adjacent their leading and trailing edges respectively for facilitating the automatic hydraulic alignment of the leading ends of the stator vanes with the direction of flow of the fluid entering the stator vanes.

Another object of the present invention is to provide a hydraulic torque converter wherein the stator vanes are flexible and pivotally mounted adjacent their leading and trailing edges so that when the fluid enters the stator element in a direction disposed relatively reversely with respect to the overall angle of inclination of the stator vanes, the latter are effective to re-direct the fluid more forwardly with a minimum of entry loss and thus enable the multiplication of torque by the converter and, when the fluid enters the stator vanes in a direction relatively forwardly with respect to the overall angle of inclination of the stator vanes, the latter are effective to impart a relatively reverse flow component to the fluid to thereby re-direct the fluid prior to its entry into the impeller.

A further object of the present invention is to provide a hydraulic torque converter having impeller, turbine and stator means wherein the stator vanes are mounted relatively stationarily with respect to the impeller and turbine and comprise flexible vanes which are effective, when the turbine tends to drive the impeller, to re-direct the fluid leaving the impeller from a relatively forward direction to a substantial reverse direction so as to thus impose a substantial load on the turbine vanes and, in turn, effect braking thereof.

In view of the foregoing general and specific objects, it will be apparent that the present invention provides a hydraulic torque converter which is particularly suitable for use in automobiles wherein it is essential, during operating conditions when acceleration is required, that means be provided for multiplying the torque between the vehicle drive engine and the vehicle driving wheels and wherein, in the interest of economy and smoothness of operation, it is desirable that there be a substantial one-to-one drive. The present hydraulic torque converter satisfies these desirable requirements, as it functions much like a conventional three element converter during the acceleration range and provides an improved engine to driving wheel speed ratio for high speed vehicle operation.

Inasmuch as the preferred embodiment of the torque converter comprising the subject matter of the present invention includes flexible stator vanes it is unnecessary that they be mounted over a one-way brake as is the practice with conventional automotive torque converters. The flexible nature of the stator vanes also contributes to minimizing shock losses in the converter due to the fluid entering the stator at an angle far removed from the entrance angle of the stator vanes. Thus, the present invention provides a torque converter which is not only economical to manufacture, but is also smoother in operation and is capable of providing better overall results and greater versatility than conventional hydraulic torque converter.

The foregoing objects and advantages will become more apparent and the invention will be more readily understood from the following detailed description of one preferred embodiment thereof which is shown in detail in the accompanying drawings wherein:

FIGURE 5 is a diagram illustrating the directions of flow of the fluid in the torque converter shown in FIGURE 1 during stall conditions of operation;

FIGURE 6 is a diagram illustrating the directions of fluid flow in the torque converter when the turbine is rotating at, what may be termed, intermediate or moderate turbine speeds;

FIGURE 7 is a diagram illustrating the directions of fluid flow in the torque converter under the conditions of operation which prevail when the fluid enters the stator in a direction slightly forwardly of the general angle of inclination of the stator vanes;

Figure 1:
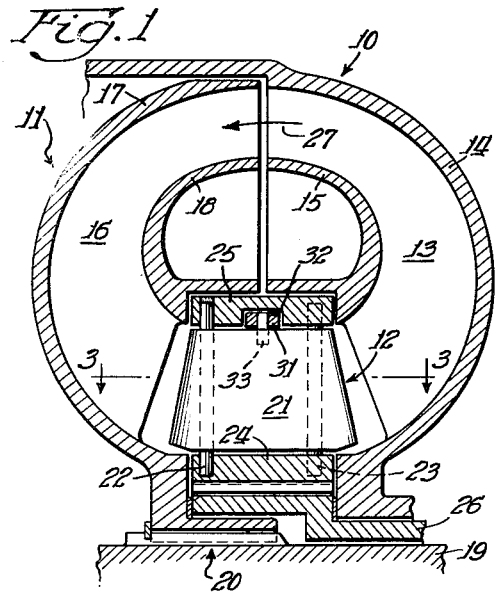
FIGURE 1 is a cross sectional view through the upper half of the preferred embodiment of the torque converter comprising the subject matter of the present invention.

FIGURE 8 is a diagram illustrating the directions of fluid flow in the torque converter when it is operating at, what may be called, relatively high turbine speeds and during which conditions of operation the stator is effective to load the impeller substantially, to thereby provide a relatively high speed ratio between the impeller and turbine elements; and FIGURE 9 is a diagram illustrating the directions of fluid flow in the torque converter during the conditions of operation when the turbine tends to be the driving element and the impeller tends to be the turbine element, such conditions prevailing in an automotive vehicle during coast load operation.

With reference to the drawings, wherein like reference numerals in the different views have been used to identify identical parts, the torque converter comprising the subject matter of the present invention consists of an impeller designated generally by reference numeral 10, a turbine designated generally by reference numeral 11 and a stator designated generally by reference numeral 12. The impeller 10 comprises a plurality of vanes 13 which are rigidly mounted between an outer shell 14 and an inner shell 15. The outer shell 14, when the torque converter is disposed between the driving engine and transmission of an automotive vehicle, is directly connected with the crankshaft (not shown) of the driving engine. The configuration of the impeller vanes 13 is clearly shown in any one of FIGURES 5–9.

The turbine 11 comprises a plurality of vanes 16 which are rigidly mounted between an outer shell 17 and an inner shell 18. The configuration of the turbine vanes 16 is clearly shown in any one of FIGURES 5–9. The outer shell 17 of the turbine 11 is fixed to an output shaft 19 by means of a spline connection 20 in order to complete a drive to the shaft 19, the latter normally comprising the input shaft of the automobile transmission mounted directly behind the torque converter.

The stator 12 consists of a plurality of stator vanes 21, each of which is flexibly mounted on spaced axes adjacent the leading and trailing edges thereof by means of a pair of pins 22 and 23. As is clearly seen in FIGURES 5–9, the pins 22 disposed at the leading edges of the stator vanes 21 are disposed relatively reversely of the pins 23 located adjacent the trailing edges of the stator vanes 21 and when the stator vanes 21 are free to assume a relaxed position, which occurs when their is no fluid flow in the converter, the vanes 21 will be inclined substantially along a plane surface passing through pins 22 and 23. This overall inclination of stator vanes 21 is slightly forwardly, as illustrated, and is represented by angle $\beta$ which is measured from a line representing the forward direction of rotation of the converter to the surface passing through the two pivot pins 22 and 23. Thus, the general inclination of the stator vanes 21 is in a forward direction. The pins 22 and 23 are disposed substantially parallel to each other and are suitably mounted in inner and outer shell members 24 and 25. The inner shell member 24 is directly splined to a shaft 26 which is fixed to any stationary part of the automobile so that the stator 12, as a unit, is held against rotation. The pins 22 and 23 afford sufficient strength to hold the outer shell 25 and inner shell 24 fixed with respect to each other so that the entire stator 12 is held against rotation.

The impeller 10, turbine 11 and stator 12 together define a substantially toroidal fluid circuit which flows, during normal operation, in a direction indicated by reference arrow 27.

Figure 3:
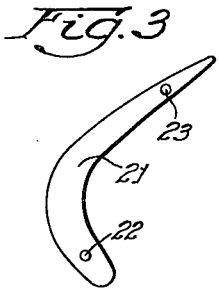
FIGURE 3 is a sectional view of one of the stator vanes taken substantially along the line 3—3 in FIGURE 1 and looking in the direction of the arrows.
Figure 4:
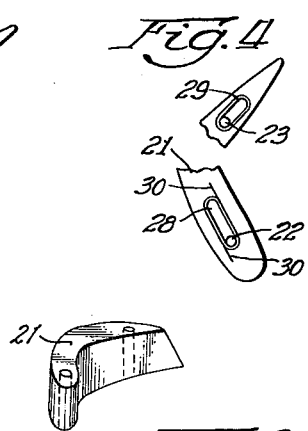
FIGURE 4 is a fragmentary detail view illustrating a slightly modified version of the stator vanes.
Figure 2:
FIGURE 2 is a perspective view of one of the stator vanes.

It is contemplated that the stator vanes 21 will be formed of some flexible material such as silicon rubber, fiber glass, leather, interwoven chain or some such substantially heat resistant and pliable material which enables flexing of the stator vanes to assume substantially any configuration between the limits shown in FIGURES 5–9, respectively. In the form of the flexible stator vanes shown in FIGURE 3, it will be understood that each vane is elastic and that it is free to conform about both pivot pins 22 and 23. In the form of the stator vanes shown in FIGURE 4, it is not so essential that they be elastic, but it is only necessary that each be resilient, as suitable slots 28 and 29 are provided to facilitate flexing of the vanes or blades. If it is desired, and found necessary in order to obtain sufficient rigidity of the leading and trailing edges of the stator vanes, metal stiffeners or inserts, as indicated at 30 may be utilized.

In order to insure that all of the stator vanes 21 comprising the stator element 12 will operate in phase with each other, a phasing ring 31 may be mounted within so as to be freely slidable within a suitable groove 32 formed within the inner face of stator shell ring 25. The phasing ring 23 is pivotally connected with each of the stator vanes 21 by means of a suitable pivot pin 33. The interconnection between all of the stator vanes 21 afforded by the phasing ring 31 tends to eliminate any undesirable operating conditions which conceivably could occur in the event that certain of the stator vanes 21 were somewhat more flexible than others of the stator vanes.

It will be noted that the outer periphery of the shell 24 comprises externally facing flats 34 whereas the inner periphery of the shell 25 comprises internally facing flats 35. By providing the opposed facing flat surfaces 34 and 35, the inner and outer edges 36 and 37 respectively, of the vanes 21 may also be flat and may fit quite closely against surfaces 34 and 35 respectively. This contributes to a minimum of energy losses which would occur in the event that there were substantial spacing between the inner and outer edges 36 and 37 of the vanes and the enclosing shells 24 and 25. Construction of the stator 12 is also simplified by providing the opposed facing flats 34 and 35 as the surfaces 36 and 37 of the vanes 21 may also be flat and can thus be spaced from surfaces 34 and 35 substantially the same distance under all conditions of operation of the torque converter.

Reference will now be had particularly to FIGURES 5–9 which show the directions of flow of the fluid within the torque converter during various conditions of operation thereof. In all of FIGURES 5–9 motion to the right is to be considered forward rotational motion whereas motion to the left is considered to be reverse rotational motion. The vectors utilized to indicate flow of the fluid within the converter in these figures are schematic only and are not intended to represent anything but the direction of flow. Further, in each of these views the input speed, which is the speed of the impeller vanes 13, is constant and the speed of the turbine vanes 16 varies.

With reference particularly to FIGURE 5, which represents the stall conditions of operation, with the automobile stationary, the turbine vanes 16 are stationary while the impeller vanes 13 are driven forwardly by the vehicle engine and the reaction on the stator vanes 21 is in a reverse direction. Vector $I_s$ designates the direction of flow of the fluid leaving the impeller vanes 13, vector $T_s$ designates the direction of flow of the fluid leaving the turbine vanes 16 and vector $S_s$ designates the direction of flow of the fluid leaving the stator vanes 21.

The reverse or backward inclination of the turbine vanes 16, while they are stationary during stall, causes the fluid to leave the turbine vanes 16 in a reverse direction as indicated by the vector $T_s$. The fluid leaving the turbine vanes 16 in direction $T_s$ impinges against the forward faces of the stator vanes 21 and causes the central portions of the stator vanes 21 to flex rearwardly, thus tending to align the leading edges of the stator vanes 21 with vector $T_s$ and thereby causing the trailing edges of vanes 21 to assume a more forward inclination, as designated by angle $\alpha_1$. Inasmuch as the stator vanes 21 are held against rotation, the fluid is caused to leave stator vanes 21 in a direction designated by vector $S_s$. It is therefore apparent, that at stall, the stator vanes 21 function to re-direct the fluid leaving the turbine vanes 16 from a substantial reverse direction to a substantial forward direction and this has the effect of unloading the impeller and enabling it to speed up, which allows the engine to operate in a range where it is capable of delivering substantially greater horsepower. The redirection of the fluid from a reverse direction, as represented by vector $T_s$, to a forward direction, as represented by vector $S_s$, enables the torque converter to multiply the impeller torque substantially so that considerably greater torque will be transmitted to the shaft 19 by the turbine 11.

With reference to FIGURE 6, the conditions of operation prevailing in the torque converter when the speed ratio between the impeller and the turbine is of the order of .4, or when the turbine is rotating forwardly at moderate speeds, will now be described. In FIGURE 6, the impeller vanes 13 are rotating forwardly at the same speed as they were rotating forwardly during the conditions illustrated in FIGURE 5 and vector $I_m$ designates the direction of flow of the fluid leaving the impeller vanes 13 at this time. Inasmuch as the automobile is now assumed to be moving forwardly at intermediate speed ratios, the turbine vanes 16 will be rotating forwardly, but at a substantially lesser speed than the speed of rotation of the impeller vanes 13, and the fluid thus leaves the turbine vanes 16 in a direction indicated by vector $T_m$. Inasmuch as vector $T_m$ has a substantially greater forward component than vector $T_s$, the fluid impinging on the forward faces of the stator vanes 21 strikes these vanes at an angle such that the intermediate portions of the vanes bend substantially as shown in FIGURE 6. The leading edges of the vanes 21 align themselves with vector $T_m$ and the trailing edges of the vanes 21 are in substantial alignment with vector $S_m$. It will thus be seen that the fluid leaves the stator vanes 21 during moderate turbine speeds at an angle of the order such as is represented by angle $\alpha_2$, which is substantially less than angle $\alpha_1$, and means that the fluid leaves the stator vanes 21 and enters the impeller vanes 13 with a substantially greater forward flow component. Thus, the impeller vanes are unloaded to an even greater extent during the FIGURE 6 conditions of operation than during the FIGURE 5 conditions of operation.

With reference to FIGURE 7, the flow conditions which prevail at a somewhat higher turbine speed relative to impeller speed than is represented in FIGURE 6, will be described. Under these conditions, the fluid leaves the impeller vanes 13 in a direction indicated by vector $I_0$ and leaves the turbine vanes in a direction indicated by vector $T_0$. Vector $T_0$ lies substantially forwardly of vector $T_m$ and as a result the fluid now strikes the rearwardly facing or reverse sides of stator vanes 21 and causes the intermediate portions of the stator vanes 21 to flex forwardly so that the fluid leaves the stator vanes in a direction represented by vector $S_0$. This has the effect of substantially loading the impeller and causes it to transmit more torque for a given speed.

As the speed of rotation of the turbine vanes 16 increases still further, the conditions represented by the vectors in FIGURE 8 will prevail. In FIGURE 8, vector $T_h$ is disposed forwardly of vector $T_0$ and the fluid impinges against the reverse sides of the stator vanes 21 and is re-directed in a substantial reverse direction, as indicated by vector $S_h$. It will be seen that when the fluid enters the impeller vanes 13 in a direction indicated by $S_h$, the impeller is very greatly loaded and this, in effect, changes the relative speed ratio between the impeller and the other rotating elements. In FIGURE 8, angle $\alpha_4$ designates the range of angles of the fluid leaving the turbine vanes 16 in which an improved speed ratio between the impeller and turbine may be established. Angle $\alpha_3$, shows the range of angles of the fluid leaving the stator vanes 21 when the fluid leaves the turbine vanes in directions lying within the arc represented by angle $\alpha_4$.

Whenever the fluid leaves the turbine vanes in a direction lying within the range $\alpha_4$, the stator vanes 21 flex, as shown in FIGURE 8, and cause the fluid to be re-directed more reversely prior to its re-entry into the impeller vanes 13 in a direction lying within the range $\alpha_3$.

FIGURE 9 designates the conditions prevailing when the turbine vanes 16 tend to impart kinetic energy to the fluid (during coast load conditions) and the fluid leaves the turbine vanes in a direction indicated by vector $T_{eb}$. This fluid impinges against the reverse faces of impeller vanes 13 and leaves the impeller vanes in a direction indicated by vector $I_{eb}$. The fluid leaving the impeller vanes 13 enters the stator and is re-directed in a reverse direction by the flexed stator vanes 21, which reverse direction is designated by vector $S_{eb}$. It will be noted that the fluid flow designated by vector $S_{eb}$ impinges against the forward faces of turbine vanes 16 and therefore acts as a brake on the turbine and provides a rather effective "engine brake" for the turbine.

It is contemplated that numerous changes and modifications may be made in the present invention without departing from the spirit or scope thereof.

What is claimed is:

1. A hydraulic torque converter having a plurality of vaned elements together defining a substantially toroidal fluid circuit; said elements comprising rotatable vaned impeller means for circulating the fluid through said toroidal circuit and thereby imparting kinetic energy to the fluid, vaned turbine means rotatable about the axis of rotation of said impeller means for absorbing kinetic energy from the fluid, and relatively stationary vaned stator means effective to change the direction of flow of the fluid prior to the re-entry thereof into said impeller means; said vaned stator means comprising a plurality of vanes constructed of a flexible material and each having relatively forwardly and reversely facing sides and each being flexibly and pivotally mounted on spaced axes respectively adjacent the leading and trailing ends of the vanes for facilitating the automatic alignment of the leading ends of the stator vanes with the direction of flow of the fluid entering the stator vanes, said stator vanes flexing under the influence of the fluid leaving said turbine means and being effective to re-direct the fluid in a more forward direction whenever it impinges against the relatively forwardly facing sides of the stator vanes and in a more reverse direction whenever it impinges against the relatively reversely facing sides of the stator vanes.

2. A hydraulic torque converter having a plurality of vaned elements together defining a substantially toroidal fluid circuit; said elements comprising rotatable vaned impeller means for circulating the fluid through said toroidal circuit and thereby imparting kinetic energy to the fluid, vaned turbine means rotatable about the axis of rotation of said impeller means for absorbing kinetic energy from the fluid, and relatively stationary vaned stator means effective to change the direction of flow of the fluid prior to the re-entry thereof into said impeller means; said vaned stator means comprising a plurality of vanes constructed of a flexible material and flexibly and pivotally mounted on spaced axes respectively adjacent the leading and trailing ends of the vanes for facilitating the automatic alignment of the leading ends of the stator vanes with the direction of flow of the fluid entering the stator vanes, the pivot axes at the trailing ends of the respective stator vanes being disposed relatively forwardly of the pivot axes at the leading ends thereof such that each of the stator vanes has an overall forward inclination proceeding from the leading to the trailing ends thereof, said stator vanes flexing under the influence of the fluid leaving said turbine means and being effective, whenever the fluid enters the stator vanes in a direction relatively reversely with respect to the general inclination of the stator vanes, to re-direct the fluid in a more forward direction, and also being effective, whenever the fluid enters the stator vanes in a direction relatively forwardly with respect to the general inclination of the stator vanes, to re-direct the fluid in a more reverse direction.

3. A hydraulic torque converter having a plurality of vaned elements together defining a substantially toroidal fluid circuit; said elements comprising a rotatable vaned driving impeller for circulating the fluid through said toroidal circuit and thereby imparting kinetic energy to the fluid, a vaned driven turbine rotatable about the axis of rotation of said impeller for absorbing kinetic energy from the fluid, and a relatively stationary vaned stator effective to change the direction of flow of the fluid for enabling the conversion of torque by said converter; each of the vanes comprising said stationary vaned stator being of a flexible material and pivotally mounted on spaced axes adjacent its leading and trailing ends for facilitating the automatic alignment of the leading ends of the stator vanes with the direction of flow of the fluid entering the stator vanes, whereby shock losses in the fluid entering said stator vanes are minimized; and a phasing ring pivotally connected with each of the stator vanes for insuring that all of the stator vanes will remain in phase upon flexing thereof.

4. A hydraulic torque converter having a plurality of vaned elements together defining a substantially toroidal fluid circuit; said elements comprising a rotatable vaned driving impeller for circulating the fluid through said toroidal circuit and thereby imparting kinetic energy to the fluid, a vaned driven turbine rotatable about the axis of rotation of said impeller for absorbing kinetic energy from the fluid, and a relatively stationary vaned stator effective to change the direction of flow of the fluid for enabling the conversion of torque by said converter; said relatively stationary vaned stator comprising generally cylindrically shaped inner and outer shell rings interconnected by a plurality of spaced pairs of mounting pins, the inner surface of the outer shell ring and the outer surface of the inner shell ring comprising a plurality of opposed facing flat regions and said spaced pairs of mounting pins being axially and peripherally spaced and respectively extending between said opposed flat regions, and a plurality of stator vanes constructed of a flexible material and respectively rotatably mounted about said pins on said spaced axes adjacent their leading and trailing ends for facilitating the automatic alignment of the leading ends of the stator vanes with the direction of flow of the fluid entering the stator vanes, whereby shock looses in the fluid entering said stator vanes are minimized.

5. A hydraulic torque converter having a plurality of vaned elements together defining a substantially toroidal fluid circuit; said elements comprising a rotatable vaned impeller means for circulating the fluid through said toroidal circuit and thereby imparting kinetic energy to the fluid, vaned turbine means rotatable about the axis of rotation of said impeller means for absorbing kinetic energy from the fluid, and relatively stationary vaned stator means effective to change the direction of flow of the fluid therethrough; said vaned stator means comprising a plurality of vanes constructed of a flexible material and each having relatively forwardly and reversely facing sides and each being flexibly and pivotally mounted on spaced axes respectively adjacent the leading and trailing ends of the vanes for facilitating the automatic alignment of the leading ends of the stator vanes with the direction of flow of the fluid entering the stator vanes, said stator vanes flexing under the influence of the fluid leaving said turbine means and being effective to re-direct the fluid in a more forward direction whenever it impinges against the relatively forwardly facing sides of the stator vanes and in a more reverse direction whenever it impinges against the relatively reversely facing sides of the stator vanes.

References Cited by the Examiner

UNITED STATES PATENTS 2,235,370　3/41　Jandasek _____ 60—54 X
2,612,755　10/52　Szczeniowski _____ 60—54

JULIUS E. WEST, *Primary Examiner.*